(12) United States Patent
Ehrlich et al.

(10) Patent No.: US 10,997,842 B1
(45) Date of Patent: May 4, 2021

(54) SMART KITCHEN MONITORING SYSTEM AND METHODS

(71) Applicant: Corlich Enterprises, Inc., Fairfield, NJ (US)

(72) Inventors: Catherine Cora Ehrlich, Santa Barbara, CA (US); Nicole Cora Ehrlich, Santa Barbara, CA (US); John Stump, Santa Barbara, CA (US)

( * ) Notice: Subject to any disclaimer, the term of this patent is extended or adjusted under 35 U.S.C. 154(b) by 0 days.

(21) Appl. No.: 16/824,400

(22) Filed: Mar. 19, 2020

Related U.S. Application Data

(60) Provisional application No. 62/967,366, filed on Jan. 29, 2020.

(51) Int. Cl.
| | | |
|---|---|---|
| *G08B 21/02* | (2006.01) | |
| *H04N 7/18* | (2006.01) | |
| *G08B 3/10* | (2006.01) | |

(52) U.S. Cl.
CPC .............. *G08B 21/02* (2013.01); *G08B 3/10* (2013.01); *H04N 7/18* (2013.01)

(58) Field of Classification Search
CPC ............. G08B 21/02; G08B 3/10; H04N 7/18
See application file for complete search history.

(56) References Cited

U.S. PATENT DOCUMENTS

| | | | |
|---|---|---|---|
| 2008/0001735 A1* | 1/2008 | Tran .................. | G06F 19/00 340/539.22 |
| 2018/0082564 A1* | 3/2018 | Fang ................. | G02B 21/0484 |
| 2018/0158288 A1* | 6/2018 | Logan ................ | G01S 19/51 |
| 2019/0318589 A1* | 10/2019 | Howell ............. | G08B 21/0446 |

\* cited by examiner

*Primary Examiner* — Ryan W Sherwin
(74) *Attorney, Agent, or Firm* — Patent Service Associates, Inc.; Lyman Smith

(57) ABSTRACT

A smart kitchen solution can help reduce fires in home kitchens by permitting a user to see, on a portable electronic device, whether a stove was left on or if there is an unexpected elevated temperature on the kitchen stove. Such an unexpected elevated temperature may be detected if the stove if left on without a pan on the stove, if the contents of a pan has boiled out of a pan, or if the stove is on at certain hours of the day, such as at night. The solution can include motion detectors, audible alerts, voice alerts and optional shutdown mechanisms to remotely turn off a stove. The system can include further options, such as built in fire extinguishing materials, arm and disarm features, various mounting capabilities and the ability to interact with a digital assistant, such as Google Home, Alexa, or the like.

20 Claims, 10 Drawing Sheets

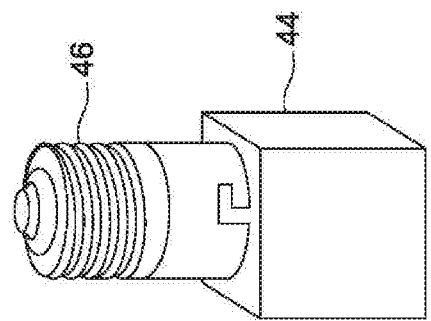
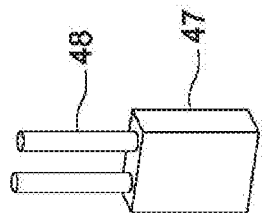
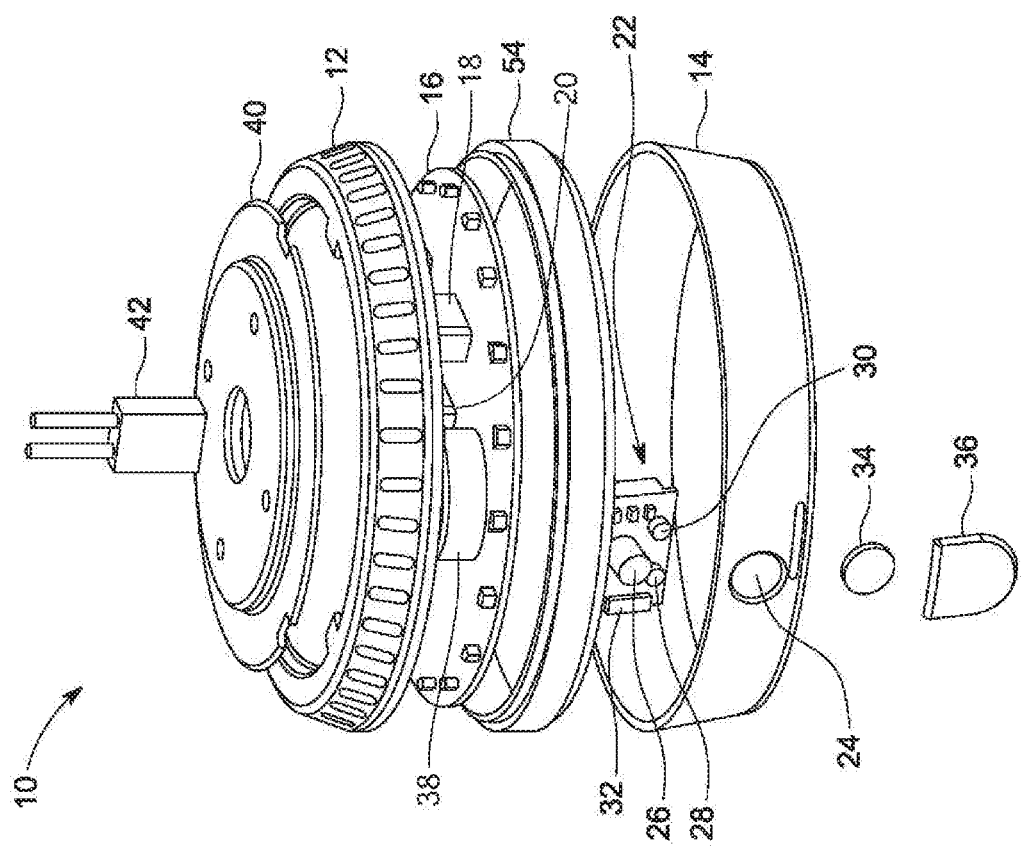

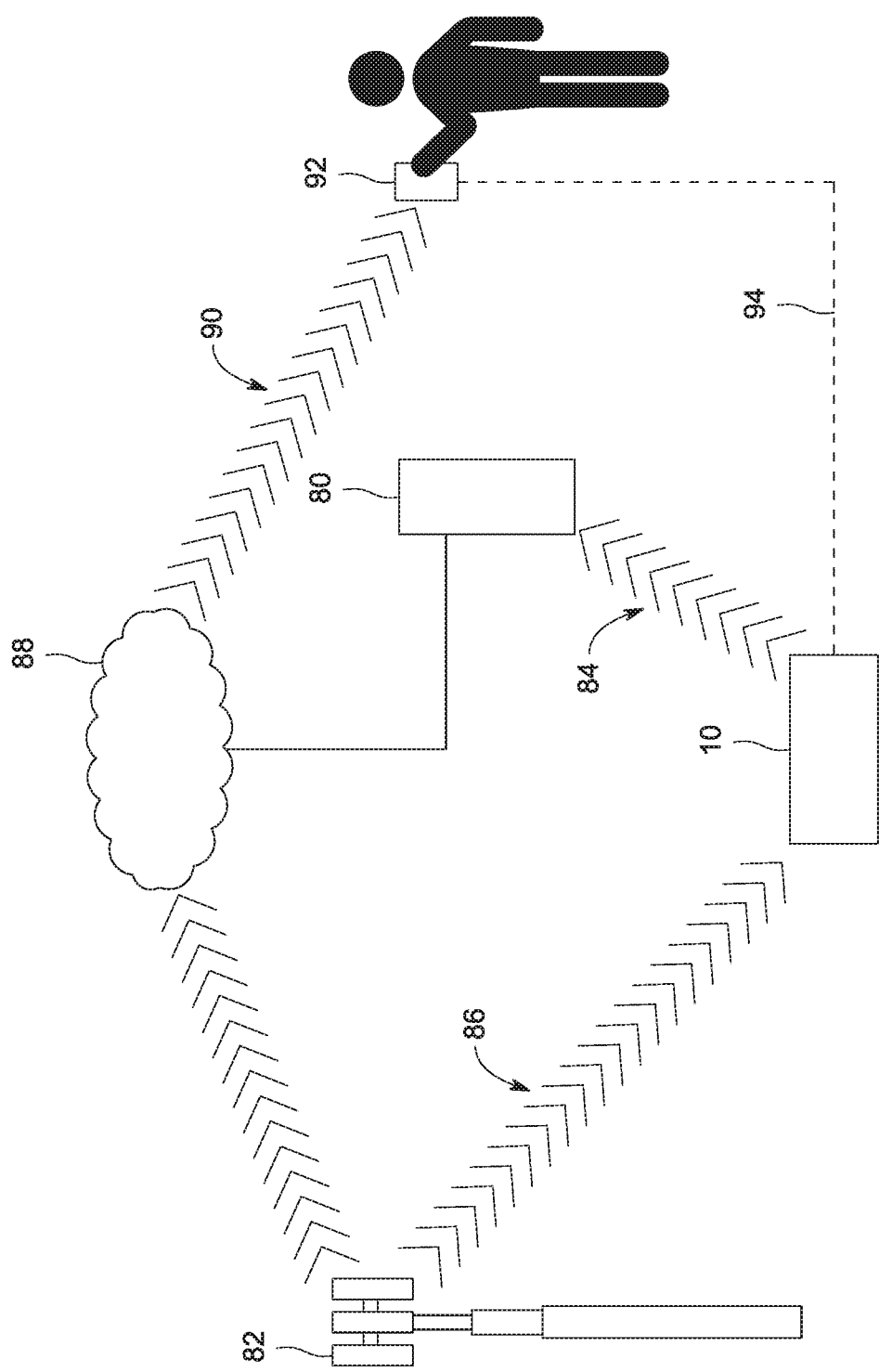

SMART KITCHEN MONITORING SYSTEM AND METHODS

CROSS-REFERENCE TO RELATED APPLICATIONS

This application claims the benefit of priority of U.S. provisional patent application No. 62/967,366, filed Jan. 29, 2020, the contents of which are herein incorporated by reference.

BACKGROUND OF THE INVENTION

1. Field of the Invention

One or more embodiments of the invention relates generally to smart kitchen solutions. More particularly, embodiments of the invention relate to systems and methods for monitoring various aspects of the environment in a kitchen.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

According to the National Fire Protection Agency, U.S. fire departments responded to an estimated average of 172,100 home structure fires per year started by cooking activities in the 2012-2016 time period. This is an average of 471 home cooking fires per day.

Some appliances, such as coffee makers and clothes irons have built-in safety features that turn these devices off after a certain period of time of inactivity. However, the nature of the use of a stove, such as a requirement to activate a cook surface or operate an oven for an extended period of time, precludes stoves from using a simple timing type of technology.

In view of the foregoing, it may be desirable to monitor of various aspects of a kitchen environment.

SUMMARY OF THE INVENTION

The smart kitchen solution as described herein offers several features to reduce fires in home kitchens. The system can include a video camera, such as a high-definition (HD) video camera, offering both live views and review of pre-recorded videos. The video camera can pivot and rotate to permit a user to see several different views of their kitchen. The pre-recorded videos may be saved within the device itself, or with a cloud-based storage, permitting the user to review the videos even if the system is off-line or damaged. The video acquisition may be activated, for example, by motion or by condition meeting predetermined criteria being detected in the kitchen. The smart kitchen solution may include other sensors as well The video camera can include one or more cameras and/or one or more lenses, where the type of lens may vary depending on application. For example, the device can include infrared (IR), thermal, and video, cameras, as well as motion sensors, heat sensors, smoke detectors, and the like. In some embodiments, the user can use a software application to control the camera and/or lens to close the camera for privacy, have video recording always on, always off, thermally activated recording, motion activated recording, or the like.

The system can be programmed to alert the user, a family member, a friend, or the like, that there is a dangerous condition present in the kitchen. The alert may be a push notification to a mobile device, a text message, a prerecorded phone call, an audible alert in the home, or combinations thereof, for example.

The dangerous condition, as used herein, can refer to the stove being left on with no cooking apparatus on the burner, the stove being left on with contents of the cooking apparatus dried out (such as water being boiled off), the stove being left on without anyone reviewing the contents of the cooking apparatus for a predetermined period of time, the oven being left on without being checked for a predetermined period of time, the oven being left on without a cooking apparatus inside, an over-temperature condition being detected by a thermal gauge, a smoke condition, a fire condition, or the like. In some embodiments, during a dangerous condition, the system can use geo-services to locate one or more of the stored contacts that are closest to the kitchen, allowing a prompt response. Other alerts may be implemented by the software application, including texting to a predetermined number, calling a number, emailing a contact, communication to another smart home apparatus, such as Google Home, Alexa, or the like. In some embodiments, the system can be configured to automatically contact emergency response personnel upon detecting a certain condition, such as fire.

In some embodiments, the system, suitably configured with appropriate actuators, can automatically turn off the stove or oven when a dangerous condition is detected. This may be performed by mechanically turning off a gas supply to the stove and oven, turning a stove's knob to the off position, or the like. Depending on the alert provided and/or the type of dangerous condition detected, the system can immediately turn off the stove or oven, or the system can turn off the stove or oven after a predetermined period of time.

The system can be used to monitor more than one home within a single mobile device software application. Further, the system, suitably configured with appropriate actuators, can include child locks and late night locks that prevent stove usage when the user selects a lock out condition, or after a predetermined hour. In some embodiments, an alert may be provided to the user if use of the stove or oven is attempted when the system is in a lock out mode or when the system has applied a late night lock.

In some embodiments, fire extinguishing media may be stored in a device located in the kitchen to release the media should a fire be detected. Aspects of the system may be provided in a ceiling or stove hood mounted device, for example, providing access to deliver the fire extinguishing media to the stove or oven area. In some embodiments, the physical device providing aspects of the system, can be hard-wired, similar to smoke alarms, by mounted to light sockets, or can be powered by a rechargeable battery, or the like.

The camera can be a video camera, a near IR and/or a thermal camera, depending on application and user preference.

The system can be armed and disarmed remotely or at the device. In some embodiments, the system may automatically arm after a predetermined period of time being disarmed, providing automated safety to the user's kitchen.

The system can be used to obtain and transact data to the cloud to access various machine learning algorithms, artificial intelligence, custom algorithms, custom firmware, and other valuable information related to stove use and related food consumption. Consumers can use a software application to review data usage and manage food re-order recommendations. In some embodiments, the software can interact with recipe and cooking software applications that may provide food ordering information and the like.

Embodiments of the present invention provide a safety device comprising a video camera operably connected to a video storage medium; a processor receiving data from the video camera; a communication device configured to send an external signal; a shutdown mechanism configured to receive the external signal and to automatically shut down at least one of an oven and a stove top when lack of use is detected for a predetermined period of time; and an alert operable to play an audio sound when at least one of a stove top or an oven is left in a powered-on configuration.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

FIG. 1 illustrates an exploded perspective view of a smart kitchen device according to an exemplary embodiment of the present invention;

FIG. 2 illustrates one embodiment of a power connection for the smart kitchen device of FIG. 1;

FIG. 3 illustrates another embodiment of a power connection for the smart kitchen device of FIG. 1;

FIG. 20 illustrates data flow between the device of FIG. 1 and a user according to an embodiment of the present invention.

Figure 4:
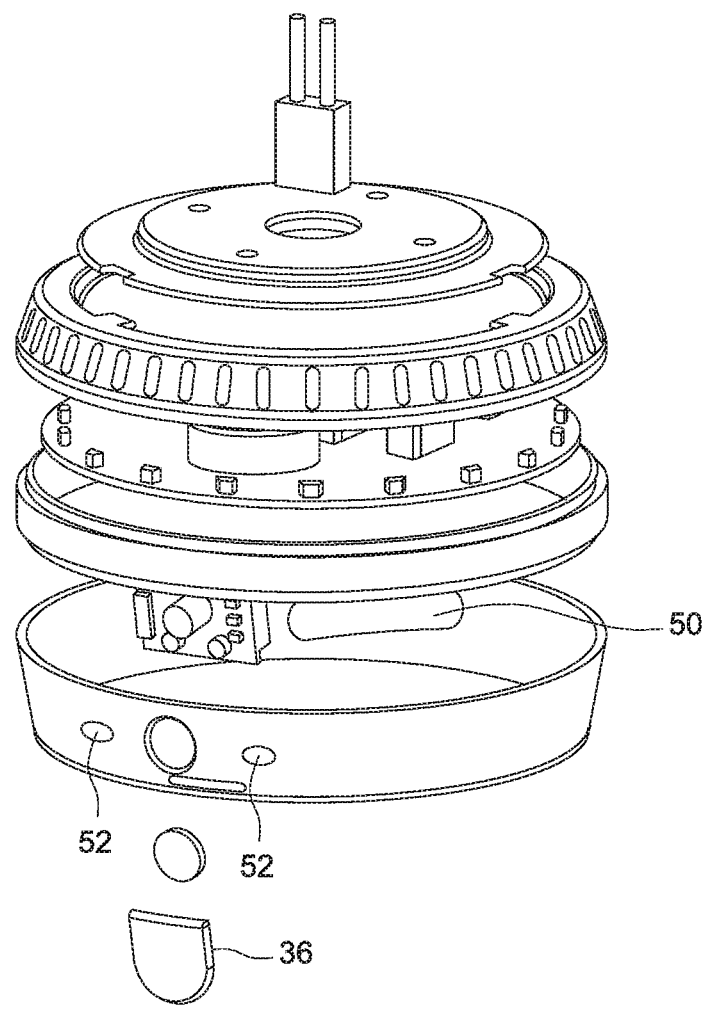
FIG. 4 illustrates a perspective view of the smart kitchen device of FIG. 1 including a fire suppression system therein according to an embodiment of the present invention.
Figure 5:
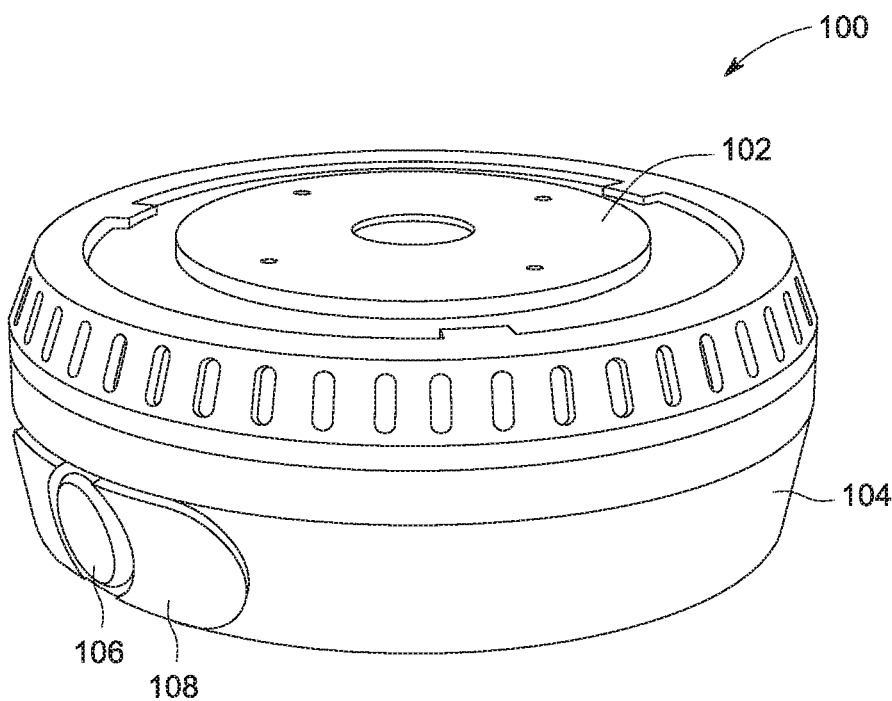
FIG. 5 illustrates a perspective view of a smart kitchen device with a closed lens cover according to an exemplary embodiment of the present invention.
Figure 6:
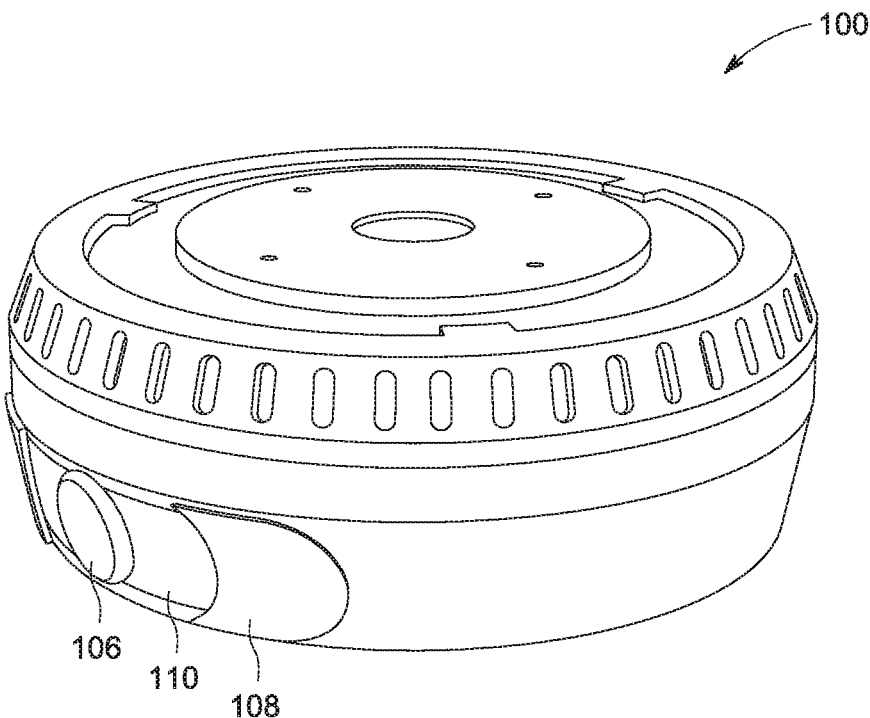
FIG. 6 illustrates a perspective view of the smart kitchen device of FIG. 5 with an open lens cover.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

A "computer" or "computing device" may refer to one or more apparatus and/or one or more systems that are capable of accepting a structured input, processing the structured input according to prescribed rules, and producing results of the processing as output. Examples of a computer or computing device may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" or "application" may refer to prescribed rules to operate a computer. Examples of software or applications may include code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Python, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be distributed among a plurality of computational units wherein each unit processes a portion of the total computation.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASHEEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G, 4G, 5G and the like.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device.

Broadly, embodiments of the present invention provide a smart kitchen solution that can help reduce fires in home kitchens. The solution permits a user to see, on a portable electronic device, whether a stove was left on or if there is an unexpected elevated temperature on the kitchen stove. Such an unexpected elevated temperature may be detected if the stove if left on without a pan on the stove, if the contents of a pan has boiled out of a pan, or if the stove is on at certain hours of the day, such as at night. The solution can include motion detectors, audible alerts, voice alerts and optional shutdown mechanisms to remotely turn off a stove. The system can include further options, such as built in fire extinguishing materials, arm and disarm features, various mounting capabilities and the ability to interact with a digital assistant, such as Google Home, Alexa, or the like.

FIG. 1 illustrates one exemplary embodiment of a smart kitchen device 10 according to an exemplary embodiment of the present invention. The device 10 can include a housing top 12 and housing bottom 14 forming an interior region. A circuit board 16 may be disposed inside the interior region. The circuit board 16 can include a wireless communication module 18 for communicating wirelessly with the smart kitchen system, as described in FIG. 4. The circuit board 16 can further include a processor and memory 20 for executing program code as described in greater detail below.

A sensor module 22 can be disposed within the interior region and one or more openings 24 in the housing bottom 14 may provide one or more sensors access to an exterior of the device 10. The one or more sensors may include a video camera 28, a thermal sensor 26, a motion detector 32 and a smoke and/or fire detector 30. The video camera 28 may be a high definition camera that can capture video and store the video in the memory of the device and may transfer the video to a cloud-based storage via the wireless module 18. The video camera 28 may optionally include a camera lens 34 and a camera cover 36 disposed over the lens 34.

The thermal sensor 26 may be a general temperature sensor that may detect temperatures above a predetermined maximum. The thermal sensor 26 may be configured to detect temperatures on each of the burners on a stove top, where a user may see these temperatures on their mobile application, as described in greater detail below.

The motion detector 32 may be used to detect motion that activates the video camera 28. Of course, the video camera 28 may also be activated by other means, for example, the video camera 28 may be activated by a dangerous condition that is detected by the device, as discussed below.

The device 10 may further include a sound generating device 38, such as a speaker, an alarm unit, or the like. The sound generating device 38 may generate an alarm tone or may be designed to both deliver an alarm tone and may transmit voice from a user, for example, so that two-way communication may be provided between the device 10 and a user at a remote location. In this embodiment, the device 10 may further include a microphone.

The device 10 can include a light lens 54 that may be configured to generate a light. The software, as discussed below, may be configured to control the intensity of the light or whether the light is on or off. The light lens 54 may flash or strobe should a dangerous condition be detected by the device of the present invention.

The device 10 can include a mounting plate 40 for mounting the device to a secure location, such as a ceiling, a stove hood, under a cabinet or the like.

Power may be provided to the device 10 by various means. For example, an electrical plug 42 may be configured to plug into the device 10, as shown in FIG. 1. The plug may be, for example, a smoke detector plug, where a hard-wired smoke detector may be replaced by the device of the present invention. In this embodiment, the smoke and fire detector 30 may provide functions similar to the replaced smoke detector. In other embodiments, as shown in FIGS. 2 and 3, an electrical plug 44 may include a threaded end 46 for connection with a standard light bulb socket. In other embodiments, the electrical plug 47 may include pins 48 that can connect with a track lighting fixture, for example. Of course, other connection mechanisms are contemplated within the scope of the present invention. Further, in some embodiments, a rechargeable battery (not shown) may be provided to power the device 10.

As shown in FIG. 4, a device 10 may further include fire extinguishing media 50 housed within the housing top 12 and housing bottom 14. One exemplary configuration for the fire extinguishing media is described below with respect to FIGS. 14 through 17. The media 50 may be released via one or more nozzles 52 should a fire condition be detected. In some embodiments, the device 10 may be programmed to automatically release the media 50 upon detecting a fire condition. In other embodiments, an alert may be delivered to the user and user intervention would be required to cause the media 50 to be released. In some embodiments, the nozzles 52 may be aligned through a device set-up process to point to the stove. In other embodiments, the video camera 28 may be used to observe a detection of the fire condition and the device may automatically position the one or more nozzles 52 in the direction of the fire condition.

Referring now to the device embodiments of FIGS. 5 through 8, a device 100 can include a mounting surface 102 for mounting the device 100 to a surface, such a ceiling in a kitchen. A motion sensor 106 may protrude through a housing 104 of the device 100. A lens cover 108 may be movable from a closed position (FIG. 5) to an open position (FIG. 6), where one or more cameras 110 may capture images outside of the device 100.

The position of the lens cover 108 may be movable via various options. In some embodiments, a smart device may be connected to the device 100, as discussed below, via the internet, for example. The smart device may control the lens cover 108 to open or close the cover. In some embodiments, the device 100 may be programmed to open the lens cover 108 when the motion sensor 106 detects motion. In some embodiments, the smart device may program the device 100 to keep the lens cover 108 closed for a predetermined period of time, after which the lens cover 108 may be open or may open based on the detection of motion. In either embodiment, an occupant may readily assess when the camera may be active by the opening of the lens cover 108. In some embodiments, the motion sensor can detect a height of a user of at least one of the stove and the oven and generating a child alert, such as a message that a child is in the vicinity of the stove or oven, when the height of the user is below a predetermined minimum.

Figure 7:
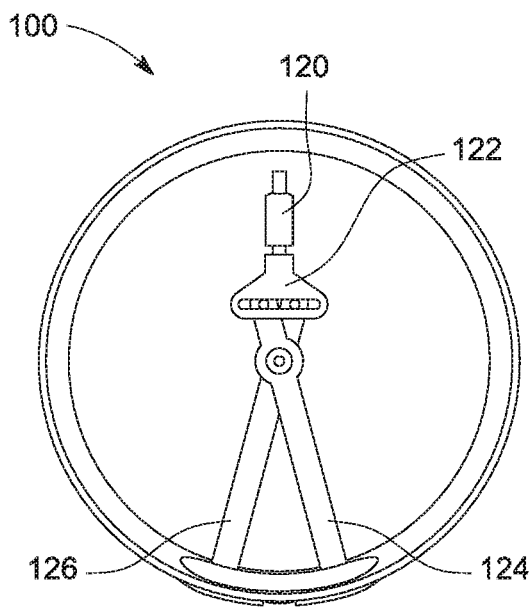
FIG. 7 illustrates a top view of a lens cover control for the smart kitchen device of FIG. 5 with the lens cover closed.
Figure 8:
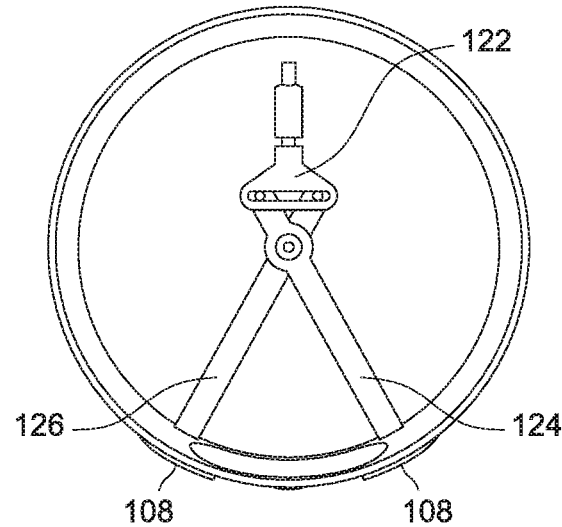
FIG. 8 illustrates a top view of the lens cover control of FIG. 7 with the lens cover open.

FIGS. 7 and 8 illustrate one example of how the lens cover 108 may be opened or closed. In this embodiment, a single actuator 120 may use a slotted member 122 to move two actuator arms 124, 126 to cause two separate lens covers 108 to open or close simultaneously. The lens covers 108 may cover a camera and a temperature sensor, for example.

Figure 9:
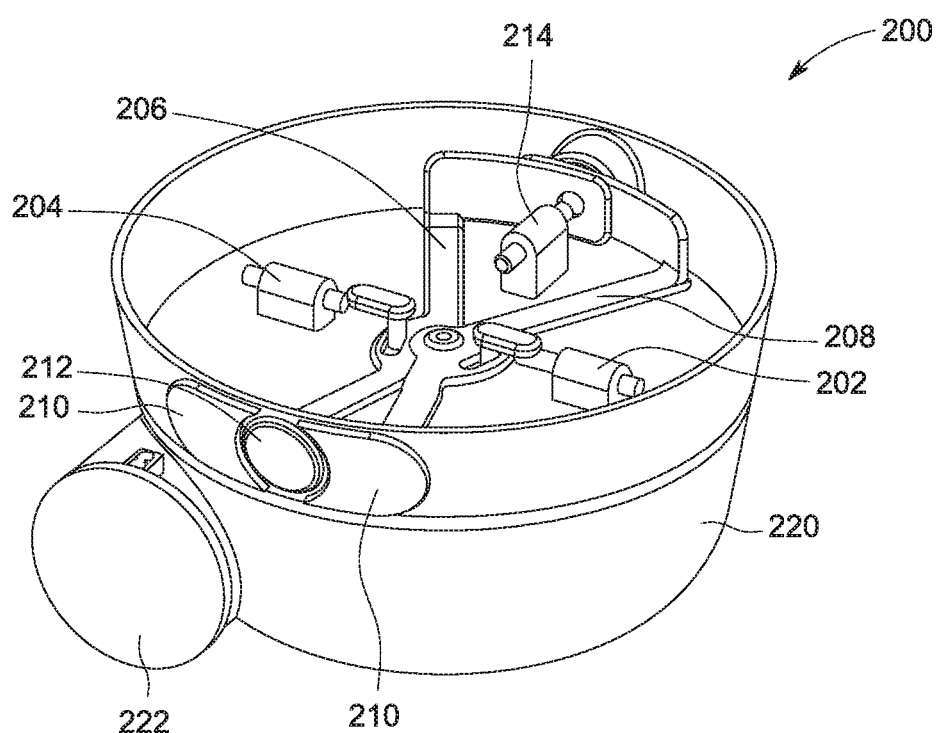
FIG. 9 illustrates a perspective view of an alternate embodiment of a smart kitchen device with two selective lens cover control and a lockout feature according to an embodiment of the present invention.
Figure 10:
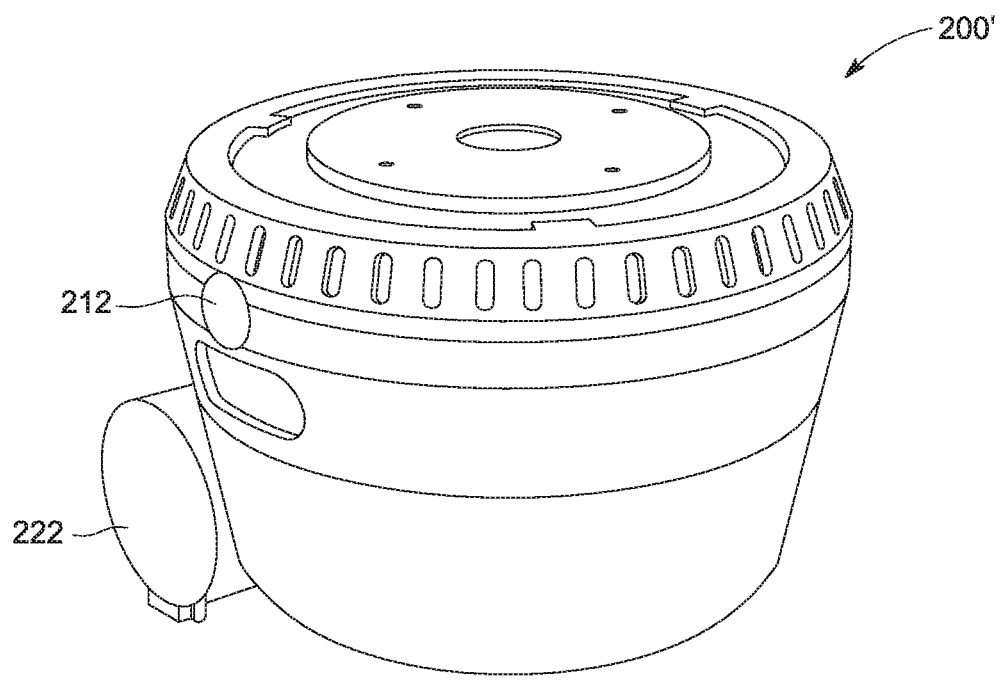
FIG. 10 illustrates a perspective view of the smart kitchen device of FIG. 9 with its lens cover closed.
Figure 11:
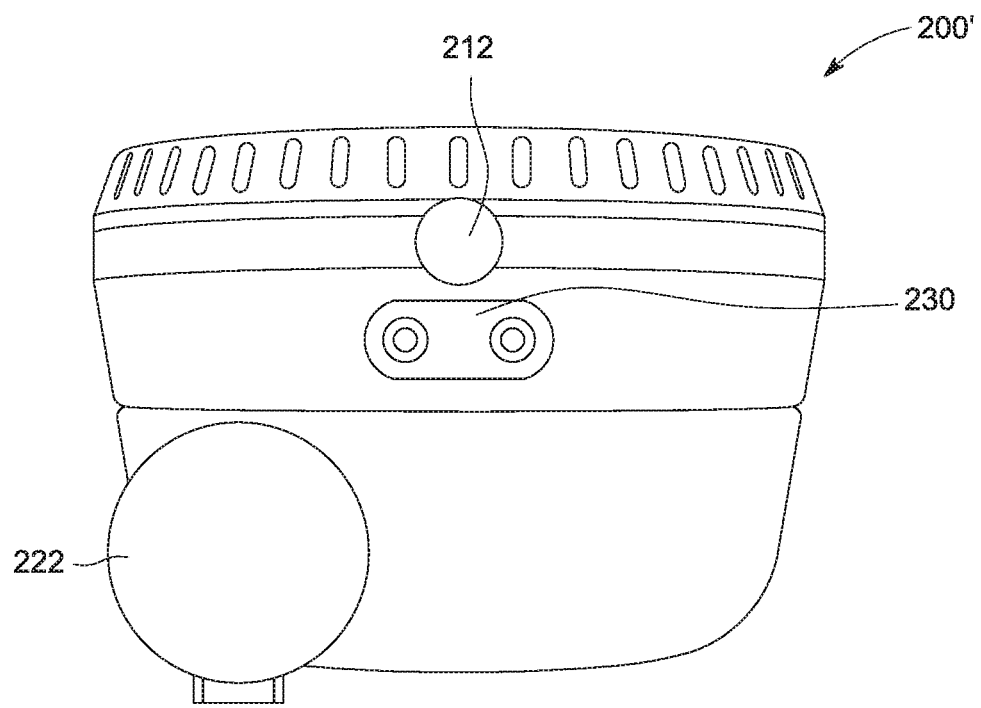
FIG. 11 illustrates a front view of the smart kitchen device of FIG. 9 with its lens cover open.

Referring to FIG. 9, for device embodiment, another embodiment of a device 200 with a lens cover, with two covers 210, movement mechanism is shown. In this embodiment, two actuators 202, 204 may be used to independently move the lens covers 210 between opened or closed positions. The actuator arms 206, 208 may not only connector to the lens covers 210, but may also extend to a locking region. A lock 214 may extend a pin through holes to secure the actuator arms in the closed configuration, as shown in FIG. 9. Like the embodiments described above, the smart phone application may be used to control not only the actuators 202, 204, but also the lock 214. Further, a motion sensor 212, like that described above, may be used to detect motion that would automatically open the lens covers 210 if such an option is chosen on the smart phone application. The embodiment of FIG. 9 also includes a fire suppression element storage region within housing 220, where, as described below, fire suppression elements may be disposed outward through the opening of the cover 222.

Figure 12:
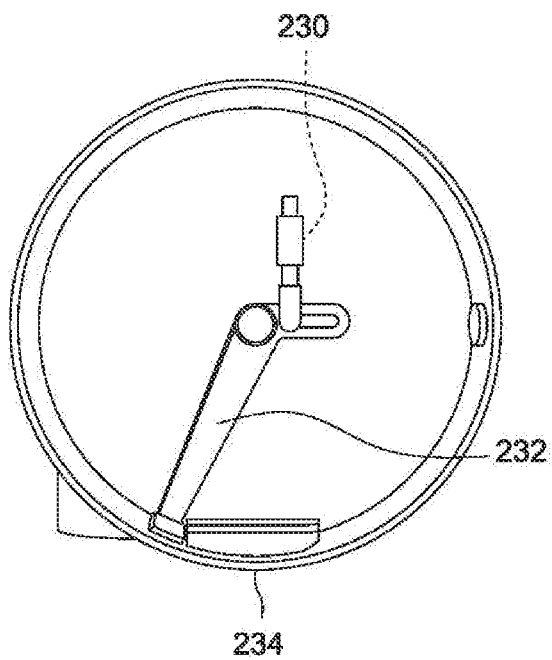
FIG. 12 illustrates a top view of a lens cover movement mechanism in the closed position.
Figure 13:
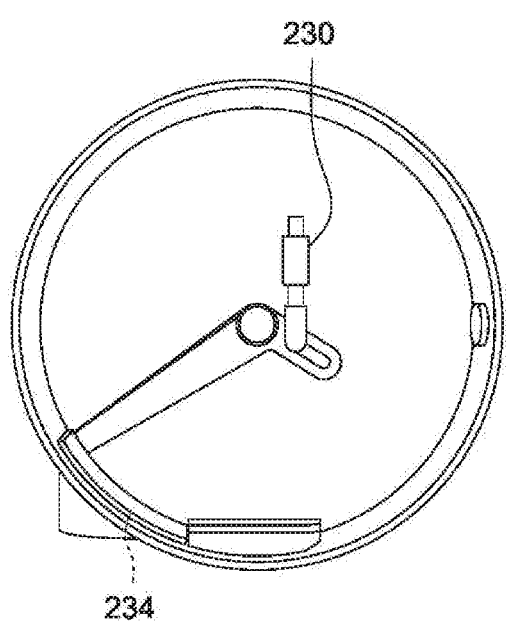
FIG. 13 illustrates a top view of the lens cover movement mechanism of FIG. 12 in the open position.

FIGS. 10 through 13 illustrate a fire suppression enabled smart kitchen device 200' (also referred to as device 200). In this embodiment, the motion sensor 212 may be disposed separately from the cameras 230 such that a single lens cover 234 may be opened and closed via actuator 230 and actuator arm 232, as best seen in FIGS. 12 and 13.

Figure 14:
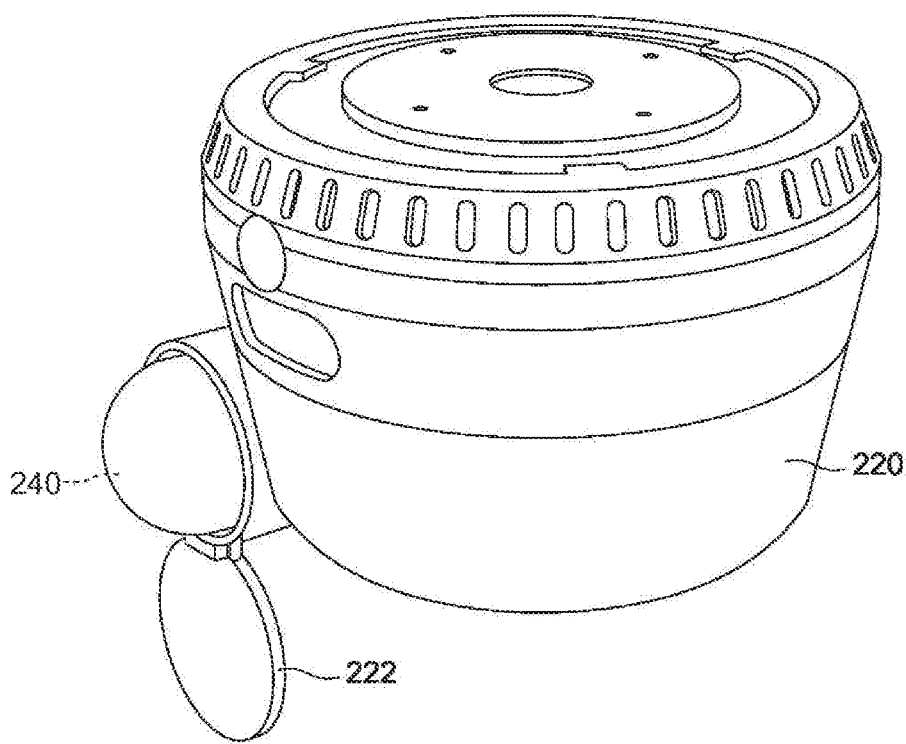
FIG. 14 illustrates a perspective view of the smart kitchen device of FIG. 9, illustrating deployment of a fire suppression device according to an embodiment of the present invention.
Figure 15:
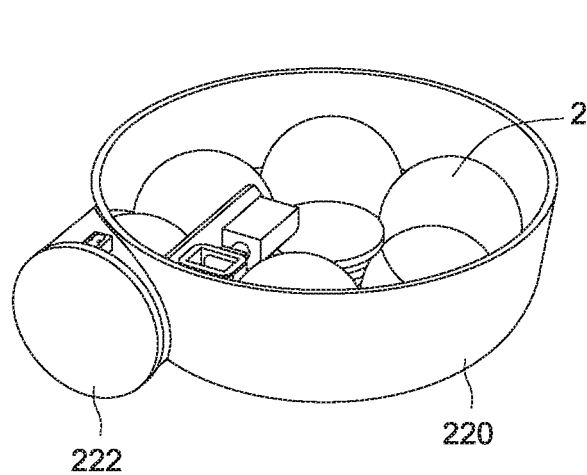
FIG. 15 illustrates an interior view of the smart kitchen device of FIG. 9, illustrating fire suppression elements in a ready to deploy position.
Figure 16:
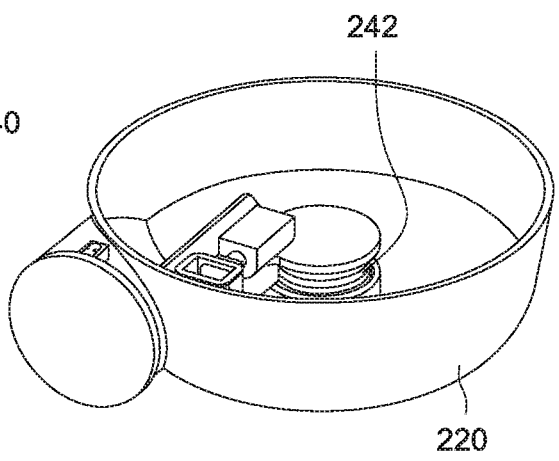
FIG. 16 illustrates an interview view of the smart kitchen device of FIG. 15 with the fire suppression elements removed therefrom.
Figure 17:
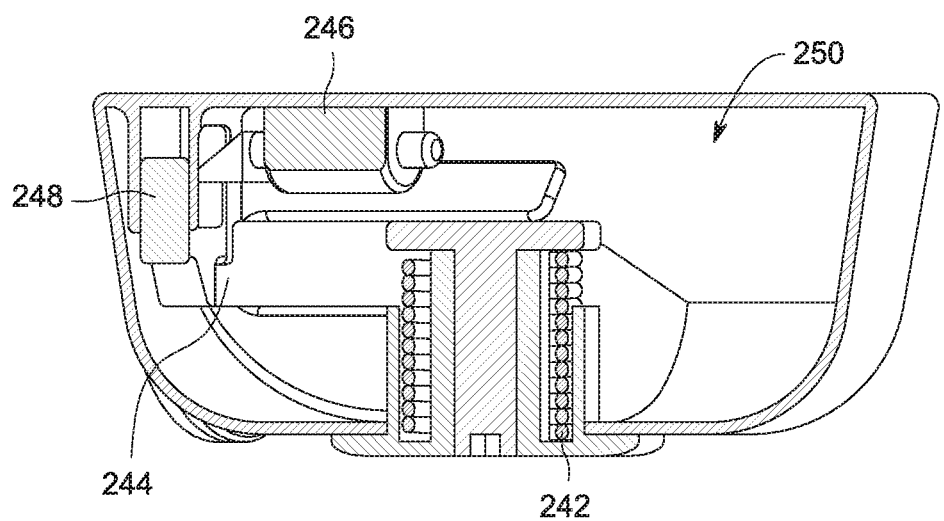
FIG. 17 illustrates a detailed view of a fire suppression element dispersal mechanism according to an exemplary embodiment of the present invention.

Referring now to FIGS. 15 through 17, the fire extinguishing media may include one or more fire suppression balls 240 disposed in a media storage region 250 within housing 220. A spring 242 may be attached to an arm 244 that may be released when an actuator 246 that moves an arm release 248. When the actuator 246 moves the arm release 248, the spring 242 causes the arm 244 to move (in this case, counter-clockwise) and causes the fire suppression balls 240 to exit from the housing 220, as seen in FIG. 14, via the pivoting open of the cover 222. The actuator 246 may be deployed automatically if a heat sensor, fire or smoke detector or the camera detects a fire condition. In some embodiments, the actuator 246 may be deployed after a predetermined period of time after a detection of a fire condition, permitting the user to view the condition remotely via their smart phone and confirm whether the fire suppression media should be released. In other embodiments, the user may be required to confirm the fire condition before the fire suppression media is released. These settings may be available to the user via the smart phone application that is connected with the device.

Figure 18:
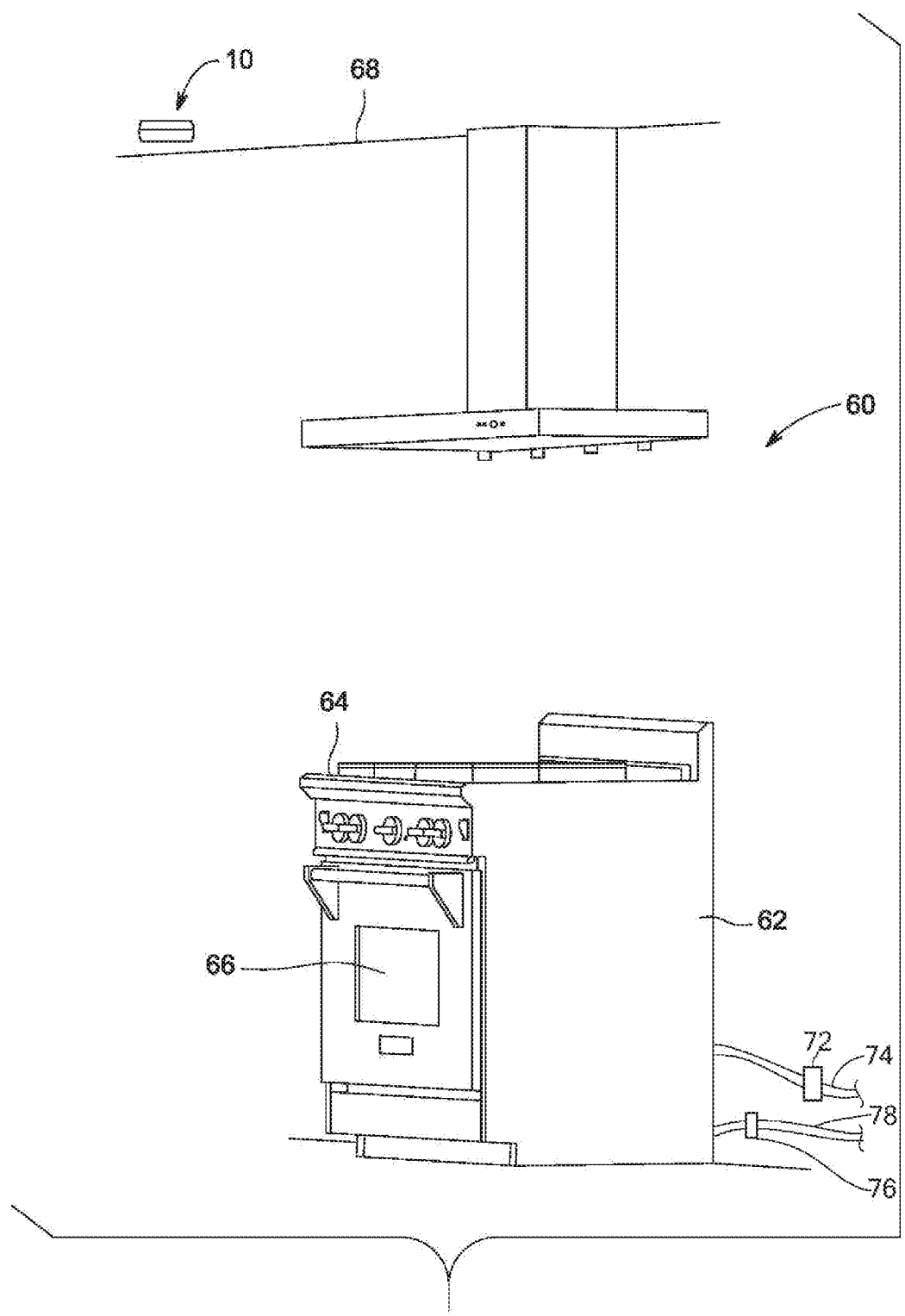
FIG. 18 illustrates a view of a ceiling mounting of the device of FIG. 1.
Figure 19:
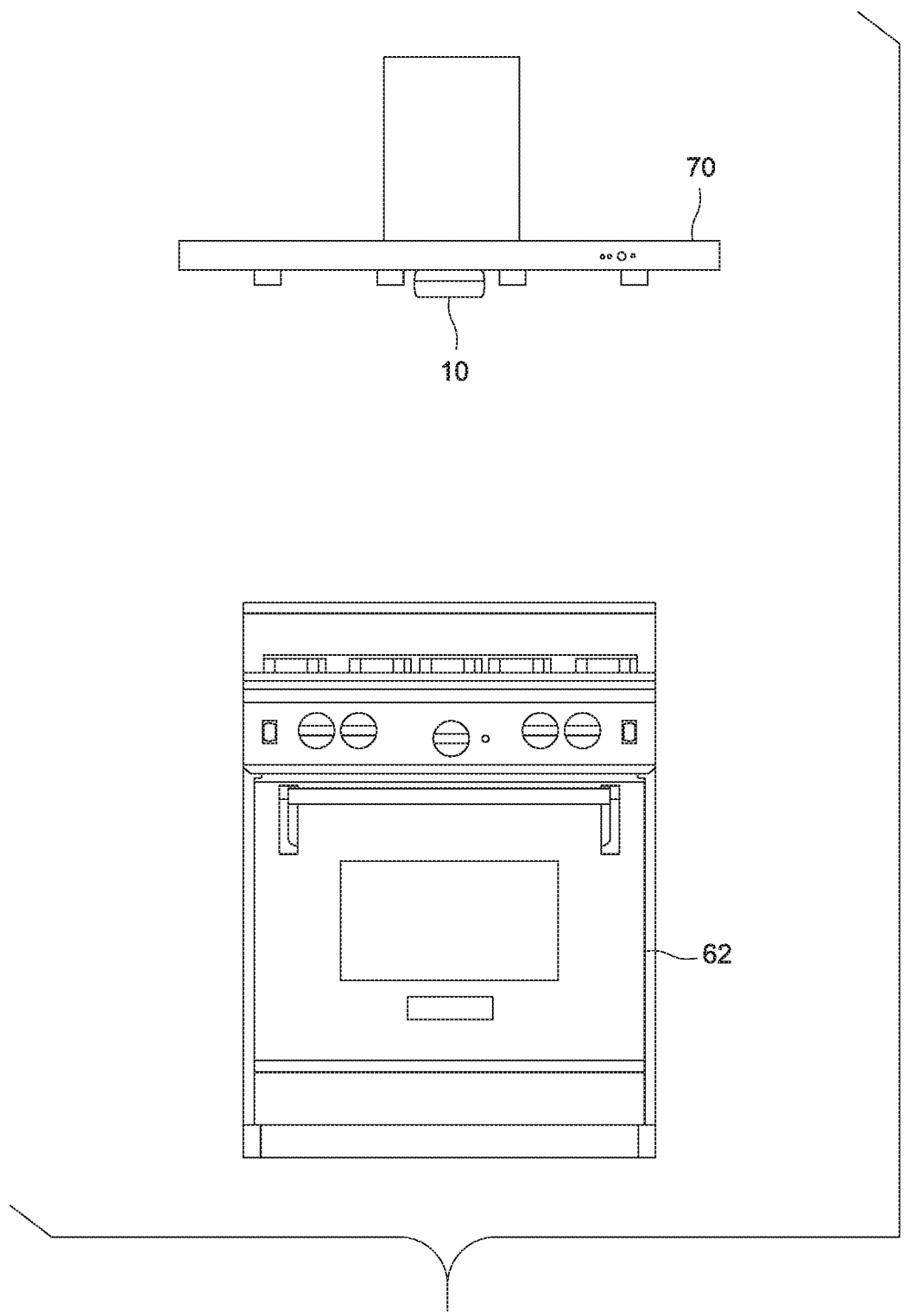
FIG. 19 illustrates a view of a kitchen hood mounting of the device of FIG. 1.

As discussed above, the device 10, 100, 200, 200' can be disposed in a kitchen in various configurations. The device 10, 100, 200 may be mounted on a ceiling 68 in a kitchen 60 as shown in FIG. 18, where the device 10, 100, 200 is near a cooking unit 62 including a stove 64 and/or oven 66. As shown in FIG. 19, the device 10, 100, 200 may be mounted in a kitchen hood 70. Of course, other mounting configurations may be used, such as under cabinet, as a stand-along device placed on a countertop, for example, or the like.

Referring to FIG. 20, the device 10, 100, 200, 200' may communicate via a wireless signal 84 to a router 80, and/or via a wireless signal 86 to a cellular tower 82. Both the cellular tower 82 and the router 80 may communicate with a cloud storage 88 for storing data, such as video and the like. Further, the wireless communication may be used to download updates or the like to the device 10.

The cloud storage 88 may send, via a wireless signal 90, data to a mobile device 92 of a user. The mobile device 92 may run a software application to receive data from the device 10. In some embodiments, the device 10 may communicate directly with the mobile device 92 via communication signal 94. The software application can include program code that can display information to the user from the device 10, including thermal data, video—either as a live stream, or as pre-recorded video, alerts, and the like. The alerts can alert the user of a dangerous condition in their kitchen. The alert may be a push notification to a mobile device, a text message, a prerecorded phone call, an audible alert in the home, or combinations thereof, for example.

The dangerous condition, as described above, can refer to the stove being left on with no cooking apparatus on the burner, the stove being left on with contents of the cooking apparatus dried out (such as water being boiled off), the stove being left on without anyone reviewing the contents of the cooking apparatus for a predetermined period of time, the oven being left on without being checked for a predetermined period of time, the oven being left on without a cooking apparatus inside, an over-temperature condition being detected by a thermal gauge, a smoke condition, a fire condition, or the like. In some embodiments, during a dangerous condition, the system can use geo-services to locate one or more of the stored contacts that are closest to the kitchen, allowing a prompt response.

In summary, the smart kitchen solution using the device 10, 100, 200 as described herein offers several features to reduce fires in home kitchens. The system can include the video camera, such as a high-definition (HD) video camera, offering both live views and review of pre-recorded videos. The video camera can pivot and rotate to permit a user to see several different views of their kitchen. The pre-recorded videos may be saved within the device itself, or with a cloud-based storage, permitting the user to review the videos even if the system is off-line or damaged. The video acquisition may be activated by motion or by a dangerous condition being detected in the kitchen, for example.

In some embodiments, the system can automatically turn off the stove or oven when a dangerous condition is detected. This may be performed by mechanically turning a stove's knob to the off position, turning off a gas supply to the stove and oven, or the like. Depending on the alert provided and/or the type of dangerous condition detected, the system can immediately turn off the stove or oven, or the system can turn off the stove or oven after a predetermined period of time. In some embodiments, as shown in FIG. 18, a stove or oven shutdown mechanism may be provided to turn off the gas supply, such as via an automatic, wireless gas valve 72 connected inline with a gas line 74 provided to the stove or oven. In other embodiments, an automatic, wireless power disconnect 76 may be provided along a power supply 78. In other embodiments, the shutoff mechanism may include a mechanical device that may physically turn a knob or electrically active a push button to turn off the stove or oven. The child lockout feature may utilize the same power disconnect 76 and/or gas valve 72, as described above, or may electronically activate a built-in child lock mechanism of the stove or oven, if available.

The system can be armed and disarmed remotely via the mobile device 92, or at the device. In some embodiments, the system may automatically arm after a predetermined period of time being disarmed, providing automated safety to the user's kitchen.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A safety device comprising:
   a video camera operably connected to a video storage medium;
   a processor receiving data from the video camera;
   a communication device configured to send an external signal;
   a shutdown mechanism configured to receive the external signal and to automatically shut down at least one of an oven and a stove top when lack of use is detected for a predetermined period of time;
   one or more motion sensors configured to detect motion;
   a lens cover configured to move between a video camera covered position and a video camera uncovered position; and
   an alert operable to play an audio sound when at least one of a stove top or an oven is left in a powered-on configuration, wherein
   the one or more motion sensors sends data to the processor, the processor resetting the predetermined period of time when motion is detected.

2. The safety device of claim 1, further comprising a voice alert mechanism operably to provide an audible alert at the safety device from a remote location.

3. The safety device of claim 1, tangibly embodying a computer readable program code having computer readable instructions that, when executed, causes a computer device to carry out an act comprising receiving a mobile alert from the safety device.

4. The safety device of claim 3, wherein the computer readable program code further includes computer readable instructions that, when executed, causes the computer device to carry out an act to receive data from one or more of the safety device.

5. The safety device of claim 1, further comprising a child lockout feature preventing operation of at least one of the stove and the oven when the child lockout feature is activated.

6. The safety device of claim 5, further comprising a motion sensor detecting a height of a user of at least one of the stove and the oven and generating a child alert when the height of the user is below a predetermined minimum.

7. The safety device of claim 1, wherein the processor delivers an alert when at least one of the stove and the oven are on during a predetermined range of non-use time.

8. The safety device of claim 1, further comprising a thermal scanner configured to detect a temperature of at least one of the stove and the oven.

9. The safety device of claim 1, wherein the processor collects data pertaining to at least one of stove use, oven use and product use.

10. The safety device of claim 9, wherein the external signal includes data regarding use of a particular food product delivered to a food replenishment system.

11. The safety device of claim 1, further comprising fire suppression media disposed within a housing of the safety device, the fire suppression media releasable from the safety device upon detection of a fire condition.

12. A kitchen safety system comprising:
   a video camera operably connected to a video storage medium;
   a processor receiving data from the video camera;
   a communication device configured to send an external signal;
   a shutdown mechanism configured to receive the external signal and to automatically shut down at least one of an oven and a stove top when lack of use is detected for a predetermined period of time;

an alert operable to play an audio sound when at least one of a stove top or an oven is left in a powered-on configuration;

one or more motion sensors configured to detect motion;

a thermal scanner configured to detect a temperature of at least one of the stove and the oven; and a child lockout feature preventing operation of at least one of the stove and the oven when the child lockout feature is activated.

13. The kitchen safety system of claim 12, further comprising a voice alert mechanism operably to provide an audible alert at the safety device from a remote location.

14. The kitchen safety system of claim 12, wherein the processor delivers an alert when at least one of the stove and the oven are on during a predetermined range of non-use time.

15. The kitchen safety system of claim 12, wherein the processor collects data pertaining to at least one of stove use, oven use and product use.

16. A safety device comprising:

a video camera operably connected to a video storage medium;

a processor receiving data from the video camera;

a communication device configured to send an external signal;

a shutdown mechanism configured to receive the external signal and to automatically shut down at least one of an oven and a stove top when lack of use is detected for a predetermined period of time;

fire suppression media disposed within a housing of the safety device, the fire suppression media releasable from the safety device upon detection of a fire condition;

a lens cover configured to move between a video camera covered position and a video camera uncovered position; and an alert operable to play an audio sound when at least one of a stove top or an oven is left in a powered-on configuration.

17. The safety device of claim 16, further comprising a thermal scanner configured to detect a temperature of at least one of the stove and the oven.

18. The safety device of claim 16, further comprising a voice alert mechanism operably to provide an audible alert at the safety device from a remote location.

19. The safety device of claim 16, further comprising a child lockout feature preventing operation of at least one of the stove and the oven when the child lockout feature is activated.

20. The safety device of claim 19, further comprising a motion sensor detecting a height of a user of at least one of the stove and the oven and generating a child alert when the height of the user is below a predetermined minimum.

* * * * *